United States Patent [19] [11] 3,859,262
Hartwimmer [45] Jan. 7, 1975

[54] PROCESS FOR THE MANUFACTURE OF FLUORINE-CONTAINING POLYMERS

[75] Inventor: Robert Hartwimmer, Burghausen/Salzach, Germany

[73] Assignee: Farbwerke Hoechst Aktiengesellschaft vormals Meister Lucius & Bruning, Frankfurt/Main, Germany

[22] Filed: July 21, 1971

[21] Appl. No.: 164,812

[30] Foreign Application Priority Data
July 25, 1970 Germany.............................. 2037028

[52] U.S. Cl...... 260/80.77, 260/87.5 B, 260/87.5 A
[51] Int. Cl............................. C08f 1/64, C08f 1/70
[58] Field of Search........ 260/87.5 A, 87.5 B, 80.77

[56] References Cited
UNITED STATES PATENTS
2,412,960  12/1946  Berry................................... 260/32
2,468,664  4/1949   Hanford et al........................ 260/86
2,471,957  5/1949   Hunt.............................. 260/87.5 A
2,479,367  8/1949   Joyce et al.......................... 260/87.5
3,401,155  9/1968   Borsini et al......................... 260/87.7

FOREIGN PATENTS OR APPLICATIONS
2,003,729  11/1969  France........................... 260/87.5 A Primary Examiner—Stanford M. Levin
Attorney, Agent, or Firm—Connolly and Hutz

[57] ABSTRACT

This invention provides a process for the manufacture of a copolymer containing at least one fluorinated mono-α-olefin by copolymerizing said fluorinated mono-α-olefin with ethylene at a low pressure using as catalyst acids of manganese, their salts or derivatives forming said acids of manganese under the reaction conditions.

11 Claims, No Drawings

PROCESS FOR THE MANUFACTURE OF FLUORINE-CONTAINING POLYMERS

The present invention relates to a process for the manufacture of fluorine-containing polymers by copolymerization of fluorine-containing olefins with ethylene.

It has been proposed to incorporate fluoroolefins, especially tetrafluoroethylene, into the growing polymer chains of other polymerizable, unsaturated organic compounds, whereby products can be obtained having considerably better physical properties than the pure homopolymers and hence a much higher use value. By incorporation of definite amounts of fluoroolefins the softening point and the thermal stability under load as well as the melt viscosity are in general noticeably improved. Moreover, the resistance to oxidative, mechanical and chemical attack is considerably increased, while the flamability and solubility are reduced, the friction coefficient is diminished and the electrical properties are improved. When readily polymerizing compounds such as styrene, acrylonitrile, methacrylic acid, vinyl esters or vinyl ethers are used, it is sufficient in most cases, slightly to increase pressure and temperature in order to obtain in the presence of conventional free radical polymerization catalysts, for example peroxides, per-acids, the salts thereof, or azo compounds, useful copolymers having a sufficiently high molecular weight and good processing properties. Polymers of this type and methods for their manufacture are described in U.S. Pat. No. 2,468,664 and Pat. No. 842,271 of the German Federal Republic.

If, however, compounds are used that are difficult to polymerize by free radical polymerization and have poor copolymerizing properties, such as olefins, copolymers with the aforesaid fluoroolefins combining the advantageous properties of two or more components can only be obtained under a pressure of several hundred atmospheres (cf. U.S. Pat. Nos. 2,412,960 and 2,468,664 and Pat. No. 842,271 of the German Federal Republic).

It is common knowledge that large scale polymerization plants laid out to withstand such elevated pressures require an excessively high investment, high running operation and maintenance costs and, moreover, are subject to severe safety regulations with respect to construction, structural arrangement and performance control. This comes true especially when tetrafluoroethylene is used as polymerization component which under the high pressures readily decomposes with explosion into $CF_4$ and C. Furthermore, in the aforesaid process the relatively high polymerization temperature of from 70° to 100°C always involves an increased formation of products of low molecular weight whereby the properties of the products are deteriorated.

Therefore, many attempts have been made to manufacture such valuable and useful copolymers on a large scale under pressure and temperature conditions which are less dangerous and less expensive.

The processes described in U.S. Pat. No. 2,479,367 and British Pat. Nos. 1,166,020 and 1,024,351 permit strongly to reduce pressure and temperature. But these advantages can only be obtained by the additional use of organic solvents- especially tert. butanol—which are sometimes the preponderant constituent of the polymerization medium. It is thus no longer possible in the suspension polymerization simply to discharge and discard the medium after polymerization. Expensive and complicated recovery and working up installations are necessary for the solvent used and the polymer obtained must be subjected to an especially intense and careful washing and drying process in order to remove quantitatively all adhering and included foreign matter. A concentration of dispersions of such copolymers is not possible either without flocculation of the solid. Moreover, the presence of the aforesaid solvents in the polymerization medium adversely affects the properties of polyfluoroolefins and of the copolymers of fluoroolefins, sometimes even to an extent such that they become useless. The solvents used act as telogenes and chain interrupting agents so that mainly low molecular weight products are obtained which do not meet the requirements.

Consequently, it has been desirable to develop a process which is free from all these disadvantages.

The present invention provides a process for the manufacture of fluorine containing polymers by copolymerizing fluorine containing olefins with ethylene in an aqueous phase, which comprises carrying out the polymerization under a pressure in the range of from 0 to 25 atmospheres gauge in an acid medium using as catalyst acids of manganese, the salts of such acids or manganese compounds forming these compounds under the reaction conditions.

It has been proposed in Belgian Patent No. 729,751 to polymerize fluoroolefins at low pressure and temperature in the presence of manganese compounds. In view of the fact that ethylene cannot be polymerized in an aqueous phase under common industrial process conditions, it was very surprising that a copolymerization of fluorine containing olefins with ethylene takes place under mild conditions in aqueous phase in an acid medium with good space-time-yields when the catalysts of the present invention are used.

Fluoroolefins to be used in the process of the invention are, in the first place, α-fluoroolefins, above all perfluorinated ones or those which do contain other halogen atoms or hydrogen besides fluorine. The fluoroolefins preferably have a number of carbon atoms in the range of from 2 to 6, more preferably 2 to 4. There are mentioned by way of examples tetrafluoroethylene, hexafluoropropene, perfluorobutene-1, and perfluoroisobutene from the series of perfluorinated α-fluoroolefins; trifluorochloroethylene, 1,1-difluoro-2,2-dichloroethylene, 1,2-difluoro-1,2-dichloroethylene, and trifluorobromoethylene from the series of halogen containing α-fluoroolefins; trifluoroethylene, vinylidene fluoride, vinyl fluoride, 1-chloro-2,2-difluoroethylene, and pentafluoropropane from the series of hydrogen containing α-fluoroolefins.

It is likewise possible to copolymerize two or more than two of these fluoroolefins with ethylene.

The monomers are used in quantities such that finally a polymer is obtained containing about 20 to 90 mole % and preferably 30 to 80 mole % of fluoroolefin(s). Copolymers containing the fluoroolefin in the aforesaid proportion have especially favorable processing and utilitarian properties. For special cases, copolymers having a lower or higher content of fluoroolefins may also be of interest.

To carry out the process of the invention the gaseous components are mixed in a supply vessel prior to the beginning of the reaction and the gas mixture is highly compressed, or the fluoroolefin(s) and the ethylene are supplied separately to a mixing nozzle over gauged rotameters and then fed to the reaction vessel. In the most simple case, the gases used up by polymerization can be replaced at short intervals in amounts controlled by the pressure, alternately from one or the other supply vessel. Liquid compounds are directly fed into the reactor by means of dosing pumps.

Highly active catalysts in the process of the invention are preferably salts of the various acids of manganese, above all the corresponding alkali metal and alkaline earth metal salts. There are mentioned by way of example salts of permanganic acid ($HMnO_4$), such as potassium permanganate, sodium permanganate, barium permanganate, magnesium permanganate; salts of manganic acid ($H_2MnO_4$), such as potassium manganate, ammonium manganate, sodium manganate, and calcium manganate; salts of hypomanganic acid ($H_3MnO_4$), such as sodium hypomanganate ($Na_3MnO_4 \times 10 \, H_2O$) and potassium hypomanganate; and the salts of manganous acid ($H_4MnO_4$), i.e. manganites.

It is likewise possible to use the free acids as far as they can be isolated as such, for example the crystalline dihydrate of permanganic acid ($HMnO_4 \times 2 \, H_2O$). Substances which are transformed under the polymerization conditions, i.e. in an aqueous acid medium, into the aforesaid compounds are also active catalysts, for example acid anhydrides, such as manganese heptoxide ($Mn_2O_7$), manganese pentoxide ($Mn_2O_5$), as well as oxyhydrates such as $MnO(OH_2)_2$; furthermore hydrolysable compounds of tetra- to hepta-valent manganese, such as acid halides, and complex compounds, for example alcoholates, acetonyl acetates, oxalates and halides, especially chlorides. It is, of course, also possible to use mixtures of the aforesaid compounds as catalysts.

It is preferable to use potassium permanganate and potassium manganate, which are available on the market in a sufficient purity.

Under comparable conditions of pressure, temperature and concentration none of the conventional catalysts initiates the copolymerization of fluorine containing olefins with ethylene.

The individual monomers have very different polymerization activities, but in most cases 0.001 to 0.1% by weight and preferably 0.003 to 0.01% by weight of acatalyst, calculated on the total amount of the polymerization medium, are sufficient. In view of the desired good properties of the products obtained and a substantial absence of foreign substances in the polymers, small concentrations are more favorable although, in special cases, a catalyst concentration of 1% by weight or there above can also be used. The catalyst can be added to the polymerization medium in portions at the beginning of the polymerization or the catalyst solution may be metered in continuously over the entire polymerization period, the latter mode of operation being more favorable for large batches.

The times of use of the polymerization batches are determined by the space-time-yield, which is relatively high owing to the high activity of the catalysts to be used according to the invention in spite of their low concentrations, the low pressure and temperature. On the average, 40 to 100 grams of polymer are obtained per liter of polymerization bath per hour.

In general, polymerization is carried out until the liquid phase contains 15 to 25% of solid, calculated on the bath, i.e. the time of use for one batch is in the range of from 2 to 5 hours.

A special characteristic of the catalysts to be used according to the invention is their very high activity at low temperatures, resulting in products having especially favorable properties, i.e. high molecular weight, regular structure and thus better properties.

Polymerization is suitably carried out at a temperature in the range of from 0° to 100°C, preferably 5 to about 50°C; an optimum efficiency, highest space-time-yields and best catalyst activity are obtained in a temperature range of from 15° to 30°C. Outside of the indicated range of from 0° to 100°C poor space-time yields are generally obtained, although in this case, too, the catalysts of the invention may sometimes be advantageous.

The fact that the copolymerization of the fluoroolefins with ethylene, which hitherto required polymerization pressures of about 100 to 900 atmospheres, can now be effected in the aqueous phase at low pressure can be attributed to the high catalyst activity. It has been ascertained that in most cases a polymerization pressure up to 25 atmospheres gauge, preferably up to 15 atmospheres gauge and more preferably in the range of from 5 to 15 atmospheres gauge is sufficient.

In the process of the invention the polymerization bath is substantially free from foreign matter, which is one of the reasons for the high purity of the polymers obtained.

In the case of a suspension polymerization the bath generally consists of water containing 0.1% of catalyst and 1 to 3‰ of a buffer regulating the pH value.

Suitable buffer substances are preferably salts which adjust the pH of the bath to a value below 7, advantageously in the range of from 4 to 5. They are used in order to obtain the polymers in a readily flowable, fine-grained state. Ammonium fluoride, ammonium chloride, ammonium nitrate, ammonium dihydrogen sulfate, sodium dihydrogen phosphate, ammonium sulfate, ammonium oxalate as well as potassium bisulfate have proved to be suitable buffer substances. The bath should contain the buffer in an about 0.01 to 0.03 molar concentration.

When the copolymer shall be obtained in the form of a dispersion 0.1 to 1‰ of a highly effective emulsifier is generally added to the polymerization bath, preferably an emulsifier of the series of perfluorinated $C_6$ to $C_{12}$ carboxylic acids, $C_6$ to $C_{12}$ perfluoroalkylsulfonic acids or $C_6$ to $C_{12}$ perfluoroalkylphosphonic acids, which simultaneously adjust the pH in the acid range. There are mentioned by way of example perfluorooctane carboxylic acid, perfluorododecane sulfonic acid, perfluorohexane phosphonic acid, perfluoroheptane phosphonic acid and perfluorononane phosphonic acid.

The polymerization is carried out either continuously or discontinuously.

In the most simple case vibrating autoclaves or stationary autoclaves provided with lifting stirrer are used as reaction vessel. To carry out the polymerization on an industrial scale, horizontal or vertical vessels provided with anchor stirrer, impeller, propeller stirrer or paddle stirrer may be used. The vessels are preferably made of iron. The inside wall may be plated with nickel or a nickel alloy or lined with silver. Best results are obtained, however, in polymerization vessels with enamel lining.

The monomers are suitably metered in via rotameters or measuring diaphragms; liquid monomers and the catalyst solutions are supplied to the bath in the vessel by means of dosing pumps.

The temperature of the polymerization bath during reaction can be kept constant in simple manner by cooling water. Alternatively, cooling may be effected by a circulating cooling brine, which may be heated or cooled in heat exchangers connected at the inlet or outlet side. Besides a permanent measurement, indication and record of the temperature in the vessel and of the cooling brine, a thermo-regulation by means of pneumatic or electronic devices is of great advantage. The same applies to the pressure control during the course of polymerization, which shall not only be measured and recorded but also maintained constant as far as possible by means of pneumatic or electronic devices.

The copolymers obtained by the process of the invention constitute excellent plastics having a relatively high melting point, in many cases even thermoplasts, which combine many favorable properties of their components, often without having their disadvantages. Copolymers of tetrafluoroethylene with ethylene, for example, can be moulded and processed on conventional machines of plastics industries because of their defined melting range of from 200° to 300°C and their viscosity properties which are more favorble than those of pure fluoropolymers. Hence, the complicated technology of polytetrafluoroethylene processing may be dispensed with and nevertheless products can be obtained which meet most technical requirements, have a good resistance to chemicals, a thermostability that is sufficient for most applications, a high tensile strength of 300 to 600 kg/cm$^2$, an elongation at break of from 300 to 600% and a specific gravity of only 1.2 to 1.8 g/cc. In addition thereto, some of the copolymers have excellent electrical properties. Owing to their good properties, the polymers produced by the process of the invention can be widely used in plastics industries. They can be injection moulded or extruded to yield sheets, films, filaments, fabrics, bristles and finished articles. Moreover, they can be used to make corrosion protecting, porefree coatings, high resistant flexible tubes, as insulating material in condensers, dielectrics in batteries, parts for electrical appliances and for coating cables and wires.

The following examples illustrate the invention.

EXAMPLE 1

An autoclave was charged with 15 moles (1500 grams) of tetrafluoroethylene, 3.6 moles (101 grams) of ethylene were added and the gas mixture was compressed at 10 atmospheres gauge.

An enamelled Pfaudler vessel having a capacity of 15 liters was charged with 8 liters of desalted water, 16 grams of ammonium chloride as buffer and pH regulator. The vessel and all inlet and outlet pipes were carefully scavenged with nitrogen whereby traces of dissolved oxygen were also removed from the bath. After scavenging, the valves were closed and 10 atmospheres of pure tetrafluoroethylene were forced in, while the polymerization bath maintained at 22° – 24°C was stirred by an impeller at a speed of 350 revolutions per minute.

As catalyst a solution of 600 milligrams of potassium permanganate (KMnO$_4$) in 2.5 liters of water was used. The polymerization was initiated by adding the first 500 milliliters of the potassium permanganate solution. Soon a rapid drop in the pressure indicated the start of the polymerization. As soon as 4 to 5 atmospheres were polymerized, the connection to the supply vessel was opened and the tetrafluoroethylene/ethylene gas mixture was metered in in the same measure as it was consumed, while degassed water was pumped into the supply vessel to maintain a constant pressure of 10 atmospheres gauge in the system. Simultaneously, about 1000 milliliters per hour of catalyst solution were pumped into the polymerization vessel. The experiment was interrupted after 145 minutes when only a small amount of monomer mixture remained in the supply vessel. The pressure was released and the suspension was discharged through the bottom valve. The polymer was separated from the bath by a sieve, washed twice, ground while wet and finally dried at 150°C.

1350 Grams of a fine-grained white product were obtained, corresponding to an average space-time-yield of 53 grams per liter per hour.

The infrared spectrum indicated that the product was a true copolymer. It was composed of 87 mole % of tetrafluoroethylene units and 13 mole % of ethylene units, calculated on the fluorine content of 72.8%. Hence, the molar ratio of tetrafluoroethylene to ethylene in the copolymer was 6.7:1.

EXAMPLE 2

A polymerization vessel having a capacity of 15 liters was charged with 9 liters of desalted water and 3 – 4 grams of a perfluorinated $C_6$ to $C_{10}$ mixture of alkyl phosphonic acids as emulsifier and pH regulator. The stirrer was rotated at a speed of 360 rotations per minute and the bath had a temperature of 22° – 24°C. The apparatus was carefully scavenged first with nitrogen and then twice with pure tetrafluoroethylene. 10 Atmospheres of tetrafluoroethylene were forced in and the polymerization was initiated by adding one fifth of a solution containing 600 milligrams of potassium permanganate in 1 liter of desalted water. The polymerization started rapidly and was continued until the pressure had dropped to 6 atmospheres gauge. Ethylene was then forced in until the pressure had reached 9 atmospheres gauge whereupon tetrafluoroethylene was forced in up to a pressure of 11 atmospheres gauge. The second fifth (200 milliliters) of the potassium permanganate solution was pumped in and polymerization was continued until the pressure had again dropped to 6 atmospheres gauge. The procedure was repeated 3 times in the same manner and order of succession. In the last repetition, polymerization was continued to a pressure of 3 atmospheres gauge. The experiment was terminated after 190 minutes. After pressure release a milky white dispersion was discharged from the vessel. Determination of the solid matter indicated a content of about 140 grams of dry substance per liter of dispersion, corresponding to a space-time yield of 45 grams pere liter per hour. In one part of the dispersion the polymer was precipitated by salting out and stirring, the precipitate was separated, repeatedly washed with water and dried at 130°C. The fine-grained white powder became soft at about 260°C and melted completely at 270°–280°C. Elemental analysis indicated a fluorine content of 58.9%, from which the copolymer was calculated to consist of 49.3 mole % of tetrafluoroethylene units and 50.7 mole % of ethylene units.

Hence, the product represented a copolymer containing the two components in a ratio of about 1:1.

EXAMPLE 3

An enamelled vessel having a capacity of 40 liters was charged with 27 liters of desalted water wherein 17 grams of perfluorooctanoic acid were dissolved while stirring. 0.3% of diethylene glycol was added as regulator. The apparatus was repeatedly and carefully scavenged with nitrogen. Next a gas mixture consisting of equimolar amounts of tetrafluoroethylene and ethylene kept in a supply vessel under a pressure of 15 atmospheres gauge was introduced, the speed of the stirrer was raised to 240 rotations per minute and the bath was heated at 30° – 33°C. In the meantime, 4 grams of potassium permanganate were dissolved in 3 liters of oxygen free water. Polymerization was initiated by adding 2 times 500 milliliters of the freshly prepared catalyst solution. A drop in pressure in the vessel indicated the rapid start of polymerization. To maintain a constant pressure of 15 atmospheres gauge in the system, water was pumped into the supply vessel in the same measure as monomers were consumed. As soon as the gas absorption subsided, further 250 to 500 milliliters of catalyst solution were added to the polymerization bath. The experiment was terminated after a period of 185 minutes and the residual gas was blown off at the head. The copolymer was discharged in the form of a milky dispersion through a valve at the bottom of the vessel. The dispersion was broken by adding acids or salts and the solid was precipitated. The separated fine white powder was repeatedly washed with pure water and dried at 170°C. 5780 Grams of solid dry copolymer were obtained, corresponding to a solids content of the dispersion of 16.2%. The space-time-yield was 63 grams per liter per hour. The infrared spectrum showed the peaks characteristic for a 1:1 copolymer. With the aid of differential thermoanalysis the product was found to have a thermal stability up to 360°C and a melt peak maximum at 282°C. The copolymer had a fluorine content of 57.6%, from which an ethylene content of 24.2% was calculated, corresponding to 53.25 mole % of ethylene and 46.75 mole % of tetrafluoroethylene, i.e. a ratio of the two components of 1.14:1.

EXAMPLE 4

The apparatus used in Example 3 was slightly modified in that separate inlets were provided for the monomers through which tetrafluoroethylene and ethylene were continuously supplied — independently of one another — in amounts exactly controlled by precision valves. The 40 liter vessel was charged with 25 liters of desalted water to which 58 grams of ammonium nitrate were added which dissolved rapidly. The impeller had a speed of 280 revolutions per minute and the polymerization bath was kept at a temperature of from 28 to 29°C. After scavenging with nitrogen, 7 atmospheres of ethylene and then 8 atmospheres of tetrafluoroethylene were forced in. A catalyst solution was prepared by dissolving 5.5 grams of potassium manganate in a mixture of 2 liters of water and 10 milliliters of 1N potassium hydroxide solution. 500 Milliliters of the freshly prepared dark green catalyst solution was pumped into the vessel. The temperature difference between polymerization bath and cooling water observed after some time indicated the beginning of polymerization which became more and more rapid after a relatively short period of time. The inlet valves for the two monomers were then opened uniformly to an extent such that tetrafluoroethylene and ethylene passed in according to the flow meters in an approximate molar ratio of 50:50 and the chosen pressure of 16 atmospheres gauge was maintained in the vessel. Simultaneously, the residual 1.5 liters of catalyst solution were added continuously at a rate of about 250 milliliters per 15 minutes. The experiment was terminated after 2 hours, the residual gas was blown off at the head and the vessel was discharged by the bottom valve through a sieve plate. The solid product separated on the sieve was repeatedly washed carefully and dried for several hours at 160° – 180°C. 4.586 kilograms of dried pulverulent copolymer were obtained, corresponding to a space-time-yield of 85 grams per liter per hour. The polymer had a fluorine content of 57.7%, meaning that 24% by weight of ethylene were incorporated by polymerization. Hence, the copolymer was composed of 47 mole % of tetrafluoroethylene units and 53 mole % of ethylene units. The product was thermostable up to a temperature of over 335°C and had a melt peak maximum of 283°C.

EXAMPLE 5

The polymerization was carried out in the apparatus described in Example 4 under the following conditions:

The vessel was charged with 25 liters of water, 10 grams of perfluorooctanoic acid and 15 grams of ammonium perfluorooctanoate as emulsifiers and 17 milliliters (0.6%) of diethylene glycol as regulator. The vessel was tightly closed and carefully scavenged with nitrogen, whereupon 7 atmospheres of tetrafluoroethylene and 6 atmospheres of ethylene were forced in. The speed of the stirrer was adjusted to 220 revolutions per minute and the temperature was kept at 20° – 23°C. 8 Grams of permanganic acid dihydrate ($HMnO_4 \times 2 H_2O$), prepared from $Ba(MnO_4)_2$ and $H_2SO_4$ with subsequent isolation of the dihydrate (cf. J. Am. Soc. 91, page 6200), corresponding to 6 grams of free permanganic acid, were dissolved in 2 liters of ice water and the polymerization was initiated by adding 2 times 300 milliliters of the dark violet catalyst solution to the polymerization bath. As soon as the polymerization had started, the valves were opend and tetrafluoroethylene and ethylene were allowed to stream into the vessel in equal molar proportions. After some time, the remaining amount of the catalyst solution was pumped into the vessel slowly and continuously. The experiment was terminated after 3 hours, the valves were shut, the residual gas was released and the copolymer dispersion was discharged. The polymer particles in the dispersion had a diameter of 0.17 micron. 4080 grams of polymer were separated, corresponding to a solids content of the dispersion of 13.15% at the end of the experiment and a space-time-yield of 50 grams per hour per liter. The product contained 50.6 mole % of ethylene.

Shaped articles were made from the copolymers of Examples 2 to 5, either by extrusion or by progressive cutting of a block cast from the melt, such as films, ribbons and strings, on which the mechanical and physical properties were determined.

The following table shows some of the excellent properties of the tetrafluoroethylene/ethylene copolymers produced by the process of the present invention.

| Product from Experiment No. | Density | Tensile strength kg/cm² 20°C | 150°C | Elongation at break (%) 20°C | 150°C | Differential-thermoanalysis melt peak maximum | start of decomposition |
| --- | --- | --- | --- | --- | --- | --- | --- |
| 2 | 1.65 | 371 | 110 | 250 | 473 | 281°C | >315°C |
| 3 | 1.67 | 512 | 120 | 450 | 500 | 282°C | >360°C |
| 4 | 1.67 | 409 | 140 | 340 | 680 | 283°C | >335°C |
| 5 | 1.68 | 522 | 170 | 420 | 550 | 287°C | >340°C |

EXAMPLE 6

The apparatus described in Example 4 was charged with 25 liters of desalted water and 3.5 grams of perfluorohexylphosphonic acid. After scavenging with nitrogen, 6 atmospheres of destabilized trifluorochloroethylene and 4 atmospheres of pure ethylene were forced into the vessel, the temperature was adjusted to 19° – 21°C and the bath was stirred at a stirrer speed of 240 revolutions per minute. The polymerization was initiated by adding 1000 milliliters of a solution containing 3 grams of potassium permanganate in 5 liters of water. As soon as the polymerization pressure had dropped to 6 atmospheres gauge, the valves of the monomer inlets were opened and trifluorochloroethylene and ethylene were introduced in approximately equimolar amounts in the same measure as they were consumed. During polymerization a pressure of 6 to 7 atmospheres gauge was maintained. Every 15 minutes a further 500 milliliters of the catalyst solution were added. The polymerization was interrupted after 120 minutes, the residual gas was blown off and the content of the vessel, a bluish-white dispersion, was discharged through the bottom valve. The very stable dispersion was broken, the solid separated, the very fine white powder was washed and dried. 1380 Grams were obtained, corresponding to an average space-time-yield of 23 grams per liter per hour. The elemental analysis indicated a chlorine content of 25.6%, from which the product was calculated to have the following composition: 84% by weight of trifluorochloroethylene and 16% by weight of ethylene or 55.8 mole % of fluoroolefin and 44.2 mole % of ethylene, or 1.26 units of trifluorochloroethylene for 1 unit of ethylene. The copolymer, which had good processing properties in the thermoplastic range, had a melting point of 179° – 180°C.

EXAMPLE 7

A polymerization vessel having a capacity of 15 liters was charged with 8.5 liters of water and 4 grams of perfluorooctanoic acid, the bath was stirred at a stirrer speed of 260 revolutions per minute and its temperature was adjusted at 24° – 26°C. After removal of the oxygen a gas mixture prepared in a supply vessel and consisting of 2 parts by volume of ethylene and 3 parts by volume of vinyl fluoride was forced in until a pressure of 8 atmospheres gauge had adjusted. The valve to the supply vessel was shut and tetrafluoroethylene was fed through another pipe until the pressure had risen to 14 atmospheres gauge. At a short interval 2 times 250 milliliters of a solution of 1 gram of potassium permanganate in 1.5 liters of water were pumped in, whereupon the polymerization started and the gas pressure in the closed system dropped gradually. When the pressure had fallen below 8 atmospheres gauge 3 atmospheres of the gas mixture and then 3 atmospheres pure tetrafluoroethylene were forced in so that the pressure in the vessel was again 14 atmospheres gauge and simultaneously, a further 250 milliliters of the catalyst solution were added. This procedure was repeated another 3 times. After 3.5 hours the last portion of the added gases had polymerized, the experiment was terminated and the dispersion discharged. The solid was precipitated, washed and dried. 1405 Grams of polymer were obtained, corresponding to a solids content of the dispersion of 12.3% and a space-time-yield of about 40 grams per liter per hour. The infrared analysis confirmed that a large proportion of ethylene and vinyl fluoride units had been incorporated into the polytetrafluoroethylene chain. The terpolymer had a fluorine content of 63.1%, i.e. by 12.75% below that of pure polytetrafluoroethylene. The product had a melting point of 272°C.

EXAMPLE 8

In the manner described in Example 7 and under analogous conditions, a gas mixture of vinylidene fluoride and ethylene was polymerized with tetrafluoroethylene using 7.5 liters of desalted water, 4 grams of perfluorooctanoic acid and a solution of 600 milligrams of potassium manganate in 1.2 liters of water with the addition of 3 drops of potassium hydroxide solution. The catalyst solution was added in 4 portions and the polymerization was continued for 120 minutes.

A bluish-white dispersion was obtained from which 680 grams of polymer could be separated, corresponding to a space-time-yield of 39 grams per liter per hour. The melting point of the terpolymer was in the range of from 165° to 170°C.

EXAMPLE 9

In the manner described in Example 7, a gas mixture consisting of 1 part by volume of trifluorochloroethylene and 2 parts by volume of ethylene was copolymerized with tetrafluoroethylene, the mixture and the tetrafluoroethylene being supplied in approximately equal amounts by volume.

As polymerization bath 7 liters of desalted water containing 4 grams of ammonium perfluorooctanoate and as catalyst a solution of 650 milligrams of potassium permanganate dissolved in 1.5 liters of water were used. 2 times 250 milliliters of the catalyst solution were added at the beginning and 4 times 250 milliliters at intervals. The polymerization was discontinued after 180 minutes.

A stable dispersion having a solids content of 10.3% was obtained, corresponding to a space-time-yield of 38 grams per liter per hour. The precipitated pulverulent copolymer had a melting point of from 245° to 250°C. According to elemental analysis the terpolymer was composed of 29.8% of carbon, 1.4% of hydrogen, 62.0% of fluorine and 6% of chlorine, corresponding to:

69.0% by weight or 54.6 mole % of tetrafluoroethylene units 19.7% by weight or 13.4 mole % of trifluorochloroethylene units
11.3% by weight or 32.0 mole % of ethylene units.

EXAMPLE 10

The conditions were analogous to those of Examples 7 to 9. A gas mixture of 2 parts by volume of vinyl fluoride and 1 part by volume of ethylene was copolymerized with pure trifluorochloroethylene. The vessel was pressured first with 6 atmospheres of trifluorochloroethylene and then with 7 atmospheres of the aforesaid mixture and the polymerization was initiated. The pressure was allowed to drop to 8 atmospheres gauge, equal parts of trifluorochloroethylene and gas mixture were forced in to adjust the former pressure and this procedure was repeated as often as necessary.

The polymerization bath consisted of 7.5 liters of water and 4 grams of dissolved ammonium perfluorooctanoate. As catalyst a solution of 550 milligrams of potassium permanganate in 1.2 liters of water was used which was added as follows: 2 times 200 milliliters at the beginning and the residual amount continuously during the course of polymerization. The experiment was discontinued after 105 minutes. A dispersion was obtained from which 354 grams of solid could be separated. The space-time-yield was 23.3 grams per liter per hour. Elemental analysis of the polymer indicated a chlorine content of 22.3% and a fluorine content of 44.3% from which the following composition was calculated:

73.2% by weight or 48.4 mole % of trifluorochloroethylene units
20.6% by weight or 34.5 mole % of vinyl fluoride units
6.2% by weight or 17.1 mole % of ethylene units.

The product has a surprisingly low melting point of 185° – 188°C.

EXAMPLE 11

Approximately 2 parts by volume of ethylene, 1 part by volume of vinylidene fluoride and 2 parts by volume of trifluorochloroethylene were copolymerized.

The vessel was charged with 7 liters of water and 4 grams of perfluorooctanoic acid. Successively, 6 atmospheres of trifluorochloroethylene, 5 atmospheres of ethylene and 2 atmospheres of vinylidene fluoride were forced in, the temperature in the vessel being 24°C. The catalyst, 1 gram of potassium permanganate in 1.5 liters of water, was divided in 5 equal parts which were added to the bath at intervals. The polymerization was discontinued after 160 minutes. From the dispersion obtained 183 grams of solid could be separated, which, after washing and drying, had a melting point of 190°C.

The terpolymer had a chlorine content of 20.8% and a fluorine content of 42.8%, indicating the following composition 68.10% by weight or 41.6 mole % of trifluorochloroethylene units
15.83% by weight or 17.6 mole % of vinylidene fluoride units
16.07% by weight or 40.8 mole % of ethylene units.

What is claimed is:

1. A process for the manufacture of a copolymer containing from 30 to 80 mole %, calculated on the total copolymer, of at least one fluorinated mono-$\alpha$-olefin having from 2 to 6 carbon atoms and from 20 to 70 mole % of ethylene by copolymerization of said fluorinated mono-$\alpha$-olefin with ethylene in an aqueous phase which comprises carrying out the copolymerization at a pressure of from 0 to 25 atmospheres gauge and a temperature of from 0° to 100°C. in an acid medium in the presence of from 0.001 to 0.1% by weight, calculated on the total amount of the polymerization bath, of a catalyst selected from the group consisting of an acid of manganese, a salt thereof and a derivative forming said acid of manganese under the reaction conditions.

2. The process of claim 1, wherein a mixture of said fluorinated mono-$\alpha$-olefins is copolymerized with ethylene.

3. The process of claim 1, wherein said fluorinated mono-$\alpha$-olefin is a perfluoro-mono-$\alpha$-olefin.

4. The process of claim 1, wherein said fluorinated mono-$\alpha$-olefin is tetrafluoroethylene.

5. The process of claim 1, wherein said fluorinated mono-$\alpha$-olefin contains chlorine or bromine as further halogen.

6. The process of claim 1, wherein said fluorinated mono-$\alpha$-olefin is trifluorochloroethylene.

7. The process of claim 1, wherein said fluorinated mono-$\alpha$-olefin contains hydrogen.

8. The process of claim 1, wherein the copolymerization is carried out under a pressure of 5 to 15 atmospheres gauge.

9. The process of claim 1, wherein the copolymerization is carried out at a temperature of from 5° to 50°C.

10. The process of claim 1, wherein said salt is a salt selected from the group consisting of a salt of permanganic acid, manganic acid, hypomanganic acid and manganous acid.

11. The process of claim 1, wherein said salt is selected from the group consisting of potassium permanganate and potassium manganate.

* * * * *